June 9, 1953  M. H. SWEET  2,641,158
GRAININESS METER
Filed Dec. 29, 1948  2 Sheets-Sheet 1

INVENTOR.
MONROE H. SWEET
BY
ATTORNEYS.

June 9, 1953     M. H. SWEET     2,641,158
GRAININESS METER
Filed Dec. 29, 1948     2 Sheets-Sheet 2
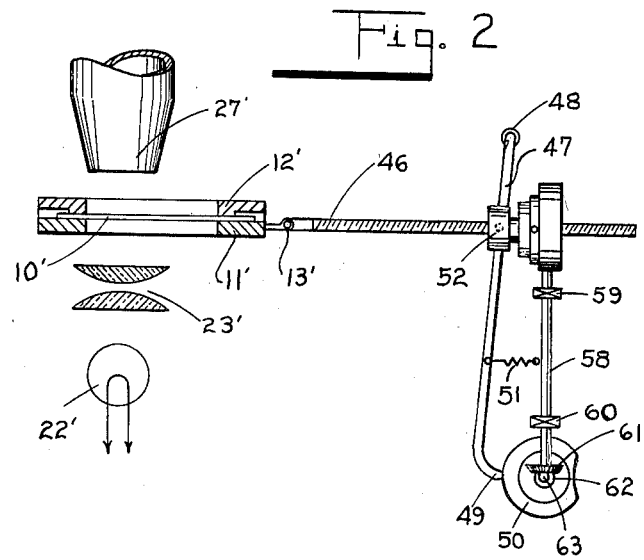
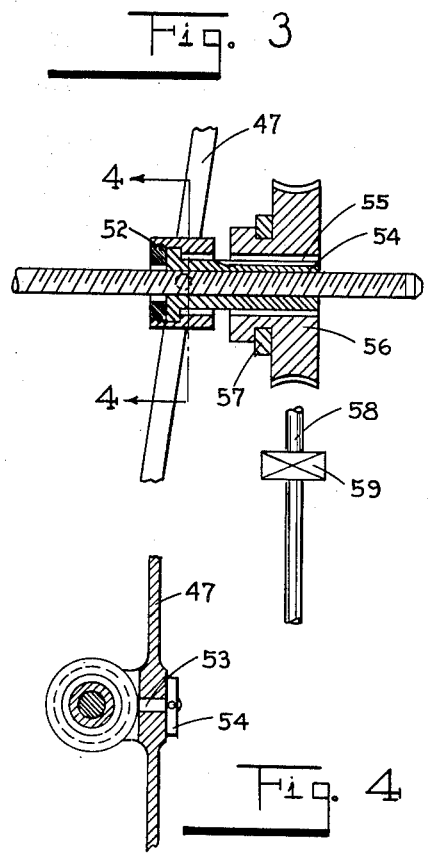
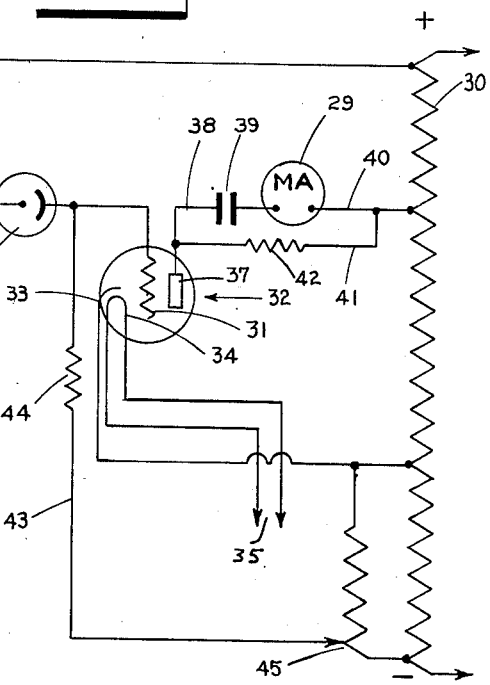
INVENTOR.
MONROE H. SWEET
ATTORNEYS.

Patented June 9, 1953

2,641,158

UNITED STATES PATENT OFFICE 2,641,158

GRAININESS METER

Monroe H. Sweet, Binghamton, N. Y., assignor to General Aniline & Film Corporation, New York, N. Y., a corporation of Delaware Application December 29, 1948, Serial No. 67,858

1 Claim. (Cl. 88—14)

This application pertains to an improvement in instruments for indicating directly the graininess of exposed and developed photographic film or other similar specimens and is a continuation-in-part of my co-pending application Ser. No. 594,250, filed May 18, 1945, now Patent No. 2,469,935. Heretofore, graininess of film and the like has been measured in various ways, but there has been no instrument devised by means of which a quantitative indication of graininess in units representing visual sensation could be shown directly on an indicator. According to certain methods of the prior art, a record is made on film of fluctuations in transmission of a microscopic area of the specimen; the record is placed in an integrator whereupon graininess may be determined by interpretation of the record. Such a method is tedious, and insufficiently accurate for most purposes. It is also slow and therefore ill adapted to use as a routine laboratory check.

It is an object of the invention herein described to provide a device in which a transparency, either positive or negative photographic film, or other similar specimen, may be inserted and by means of certain optical, mechanical and electronic devices, an objective test made of the graininess of the specimen. The quantitative value is directly indicated in units of graininess representating visual sensation values rather than arbitrary standards.

It is also an object of the invention to devise a simple mechanism for the purpose which may be relatively cheaply constructed and which shall be dependable in operation, have stability of circuit, and therefore give an accurate reading of graininess over a wide range and for an extended period of time.

The invention is hereinafter described by reference to preferred embodiments of the same. According to the invention, the instrument functions to indicate the density fluctuation of the specimen during animation. This density fluctuation is indicated as a measure of the graininess of the specimen. The mechanism embodies a holder for the film or other specimen, mechanical means for animating the holder and therefore the film, and an optical system by which a spot on the film is illuminated and magnified and the light from the spot caused to energize a phototube. The animation of the specimen in effect causes the lighted spot to traverse a short distance to and fro along the film, thereby bringing into the field of the magnifier and the light beam a continuously changing area of the specimen so that the phototube is affected by light from the source as modified by the continuously changing area through which the light must pass before being directed into the phototube.

In accordance with the invention the phototube response is applied to an amplifier having specific transfer characteristics effecting a nonlinear amplification of the input voltage in accordance with a predetermined distortion pattern, which follows a logarithmic curve. In other words, the amplifier in the measuring system responds logarithmically to input excitation and the output voltage or current (either may be utilized) will be proportional to the logarithm of the input voltage or current, respectively.

The advantages resulting from a logarithmic amplification of phototube response in graininess measurement are two-fold.

1. The indication of the meter will represent relative density values corresponding to the response of the human eye, instead of indicating linear or arbitrary units. Since the eye responds logarithmically to changes in light intensity a logarithmic compensation of the linear phototube response will produce the desired effect.

2. The indicating meter can be calibrated in units of graininess representing visual impressions over a linear scale.

As mentioned before, it is the density fluctuation which is translated into a measure of graininess. Consequently, the instrument is made responsive only to fluctuations in density. This is accomplished by utilizing only the A. C. component of the photoelectric current variation so that it is the alternating component of the current which flows when the specimen is animated.

In the event that the graininess of a specimen in which density is not the same throughout the entire specimen is to be indicated, or allowance for selection of a non-representative area made, the holder for the specimen is progressed throughout an extended range in addition to the animation above-mentioned. In that way, an average, or maximum and minimum values of graininess of a subject specimen may be determined.

Other objects and advantages will be apparent from the following description of the invention, pointed out in particularity in the appended claims and taken in connection with the accompanying drawings in which:

Fig. 2 is a view similar to Fig. 1, but leaving out details of the magnifier and circuit and wherein the specimen is animated and is also slowly progressed throughout an extended range.

Fig. 3 is a section taken vertically through a longitudinal center line of Fig. 2 and showing details of the means for progressing the specimen in addition to animating it.

Fig. 4 is a section taken at line 4—4, Fig. 3.

Fig. 5 is a diagrammatic view showing one amplifying circuit which may be employed in the block diagram of the amplifier in Fig. 1.

Figure 1:
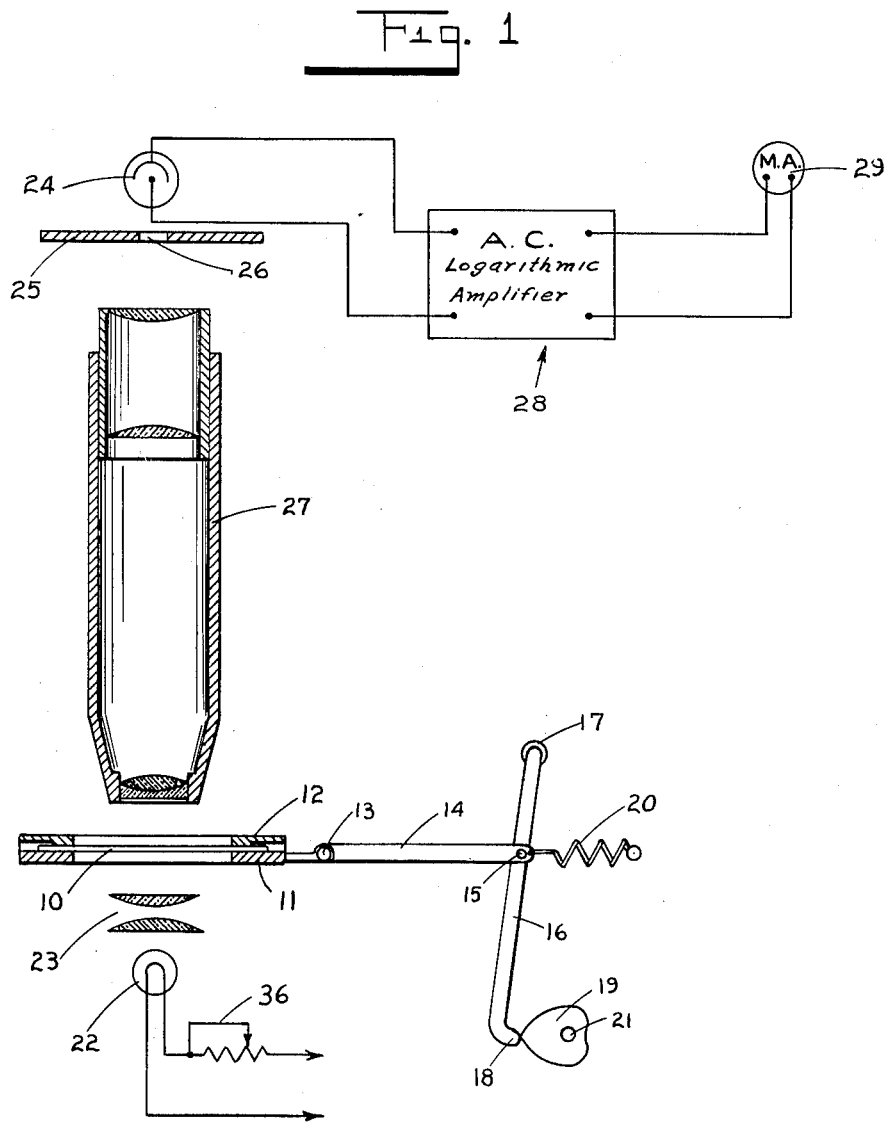
Fig. 1 is a diagrammatic view of the invention wherein the specimen is animated, but not given any additional movement.

In Fig. 1, a specimen, such as an exposed and developed film 10, is clamped within a holder comprising a base 11 and a cover 12, these being held within guideways (not shown) and within which the holder may be reciprocated. The holder extends outwardly to a hinge 13 to which is connected a link 14 attached at its opposite end to a pivot 15 intermediate the length of a lever 16 capable of being swung about a fixed center 17 at its upper end. The lever 16 has a toe 18 at its lower end engageable with a cam 19 by which it is moved in one direction, a spring 20 providing for return movement in the opposite direction. It has been found that the specimen should be animated by moving it to and fro at about 500 cycles per minute, for the particular dimensions of the model herein described. It is the linear velocity of the specimen which is of importance to the frequency response characteristics of the electronic system. Accordingly, the cam 19 is rotated by shaft 21 which is driven approximately at that speed by a suitable source of power, for example, an electric motor. The design of cam 19 is preferably such that the specimen is animated by moving it through about three milimeters to a centimeter of travel and at a relatively uniform rate. Preferably the cam should give to the holder rapid acceleration and deceleration with a more or less uniform rate of travel intermediate the ends of its reciprocatory movement. Of course, other means for imparting the animation will be suggested to those skilled ni the art, and that herein illustrated and described is given by way of example only.

The specimen is illuminated by an incandescent lamp, or other suitable source of illumination 22, the rays from which pass through a condenser 23 which may take the form shown or may merely be a simple convergent lens adapted to concentrate light upon the specimen. An adjustable resistance 36 allows regulation of the intensity of the light source 22.

A magnifying means is so positioned on the receiver side of the specimen that the illuminated area thereof is greatly magnified before the light reaches the phototube. A phototube 24 is positioned in line with the light 22, condenser 23, and a baffle 25 having therein an aperture 26 by which the lighted area is confined to a small diameter. A magnifier 27 herein shown is a simple microscope, but it may take any convenient form so long as the specimen is suitably enlarged and resolved to be imaged at the phototube 24 through the aperture 26.

The phototube 24 is connected electrically to an amplifier shown here in block diagram and generally indicated by numeral 28. The marking in the block diagram shows that the amplifier used between the phototube and the indicating instrument is of the logarithmic response type. This is a salient point of the invention and it was pointed out in the foregoing that logarithmic amplification of the phototube output has certain marked advantages.

The amplifier in the block diagram of Fig. 1 may be any of the known types having the required logarithmic response characteristics, as long as the output delivered to the indicating meter contains only the A. C. component of the phototube signal, in view of the fact that the measurement of graininess is based on the fluctuating density values of the specimen produced by its reciprocal animation. An amplifier circuit particularly suitable for the purpose is shown in Fig. 5 and will be described later. The indicator meter may be a milliammeter indicating alternating current preferably of the rectifier type, or a voltmeter of similar type, depending upon the output circuit of the amplifier where either the current or the output voltage may be utilized for this purpose. The meter may be calibrated in any system by which graininess may be measured, it is preferred to use units for quantitatively measuring that function, such as have been suggested by Professor Goetz, since there is no universal standard at this time.

It should be remembered that by virtue of logarithmic amplification the inherent linear response of the photocell is so compensated that the meter scale divisions will represent true visual sensation values of density instead of the arbitrary values heretofore used which inherently indicated the log of graininess due to the linear response of prior instruments.

Now referring to Fig. 5, a circuit diagram is illustrated such as might be employed for amplifying and for measuring the alternating current component of the phototube output thereby indicating graininess. If the specimen 10 were not animated, or if it were absolutely homogeneous and were animated, the light falling upon the tube 24 would not vary in any significant amount, and thereby the current flowing from the light sensitive tube would be either zero or a constant value. Assuming it to be a direct current, and since the amplifier 28 is an alternating current amplifier, there would be no amplification of current and no indication by meter 29, Fig. 1. In setting the meter, that is, in making a zero adjustment, this fact is employed so that the scale on which graininess is to be read would indicate a perfectly homogeneous specimen when no alternating current impulse is set up in the circuit. That is, a specimen being animated, but perfectly grainless, would affect the meter in the same way as a specimen having a finite graininess, providing the latter specimen were held stationary.

The phototube 24 is preferably a type 929 tube of the Sb—Cs coated type. This is not the only tube possible of use, and in fact, any tube having the desired response to the light source employed, and having a linear response may be used in place of the one just mentioned. The anode of tube 24 is connected to the positive end of a voltage divider resistance 30 from which current is drawn, and of course, to which current is supplied from any suitable source, such as a supply line, battery, or rectified and filtered source of current from an A. C. supply. The output of the phototube is taken from the cathode which is connected to the grid 31 of an amplifier comprising a triode, generally indicated by numeral 32. The amplifier may be of the type 6F5, but others may be employed having similar characteristics. The tube 32 has a cathode 33 which connects to a point on the voltage divider resistance 30. The tube filament 34 is supplied with current from a suitable source indicated here as a supply line 35. Tube 32 has an anode 37 which is connected through a load resistor 42 to a suitable point on the voltage divider 30. The alternating signal voltage across the load resistor 42 is applied to the utilization circuit which in this case is a suitable A. C. meter 29. The D. C. component of the anode current is filtered out from the meter circuit by the condenser 39 in series between the meter 29 and conductors 38 and 40 terminating at the anode 37 and the supply top of the voltage divider 30, respectively.

The grid circuit of the amplifier comprises the grid resistor 44 which returns the grid of the tube 32 to a point on the voltage divider 30 which is more negative than the cathode 33. In order to adjust the grid bias voltage so obtained, a potentiometer 45 is connected between the cathode return and the negative leg of the divider. The rider of the potentiometer connects to the grid resistor 44 by means of conductor 43.

The above amplifier circuit is an adaptation of the circuit described in my U. S. Patent 2,406,716 and operates essentially in the same manner, except that it will respond as far as indication is concerned only to the A. C. component of the input signal. The logarithmic response is a result of the tube characteristics at the voltage used and enhanced by the proper choice of values for the grid resistor 44 and the anode resistor 42. The anode resistor is effective to produce a uniform log relationship between the anode current and the grid current at high signal input levels when the effective anode current is high and, consequently, the voltage drop across the anode load resistance is high in comparison with the anode supply voltage. This condition is observed at low density values or high light transmission through the specimen.

The grid resistor, on the other hand, forms a voltage divider across the supply in series with the phototube and the current therethrough opposes the grid current. This bucking current is relatively small in the order of $10^{-8}$ amperes which at high density values, or low light transmission through the specimen is appreciable and corrects the log relationship between anode current and grid current which would tend to depart at low excitation of the phototube. The compensation obtained by the grid and anode resistors makes the response of the amplifier tube logarithmic over the entire range of densities that may be encountered due to graininess. In practice, it was found that a high value of grid resistor of the order of 1000 megohms gave good results. The value of the anode resistor is not as critical and values between 25,000 and 100,000 ohms may be used depending on the operating voltages, tubes and circuit parameters.

Utilizing the A. C. component of the phototube output the overall density which would be a measure of the D. C. component of the phototube will not affect the indication of the instrument. The A. C. component of the phototube output being amplified by a logarithmic amplifier is fundamentally a function of the logarithmic change in light intensity. Therefore, as an example, if the specimen density is high, say 2.0, a fluctuation of 10% (density .05) will cause a definite meter reading. The same .05 variation at a low overall density of the specimen, say 0.8 density, will also produce the same reading. In instruments of linear response this condition does not prevail and the reading of graininess must be referred to the particular overall density of the specimen since the per cent change indication will not be uniform at varying overall densities.

*Operation*

In practice, a specimen, such as a photographic negative 10, is inserted in the holder and the source of illumination 22 is energized. The meter 29 wil lindicate zero, or lack of grain when the specimen is stationary. The cam 19 is caused to rotate, thereby imparting reciprocation to the holder 11 so that the specimen is animated with respect to the light beam concentrated thereon by condenser 23. The light beam illuminates a spot on the negative which is then greatly magnified, and the light flux from a small area passing through the aperture 26 falls upon the phototube 24. If the specimen has no graininess whatsoever, current flowing from the phototube to the grid 31 of tube 32 representing overall density would assume some particular positive value and would remain at that value. Since it is a constant current, there would be no fluctuation or pulsation therein, and the indicating meter would not be responding to the current in any way. Accordingly, the meter would correctly indicate lack of graininess in the specimen. Of course, all developed photographic emulsions have finite grain, and generally the metallic silver grains are of appreciable size and also tend to concentrate in clusters, that being the most frequent and troublesome form of graininess. When such a specimen is animated across the light beam, the lack of homogeneity in the successively illuminated areas through which the beam is projected during the cycle, gives rise to a fluctuating quantity of light falling upon the tube 24. That causes a corresponding fluctuation in the current from the tube 24 to the grid 31 of the tube 32. The amplitude of this current pulsation varies linearly due to the characteristics of the phototube.

The linear current variations, as stated before, are compensated by logarithmic amplification and the resultant current output is a measure of the graininess of the specimen.

The graduation of the scale is dependent to some extent on the magnification of the microscope 27, but in any event is so made in accordance with the invention as to represent the comparative graininess of the specimen in values of visual impressions within the range encountered for the usual photographic emulsions. It may be desirable for certain purposes to graduate the instrument in such a way that it can be used for relatively coarse grained emulsions by employing one scale, and so as to bring into the circuit an increased sensitivity for extending it to emulsions which are relatively fine grained.

*Modification*

Now referring to Figs. 2, 3 and 4, a modification is shown in which, in addition to the animation of the specimen, it is also progressed across the light beam, thereby to make possible a more representative indication of graininess in the event the particular area selected, as in Fig. 1, should not be a representative area. This modification also may be more suitable for use with developed images varying greatly in density throughout most of the total area. In Fig. 2, only so much of the basic instrument is shown as is necessary for illustrating the additional mechanism. Elements in this figure similar to those of Fig. 1 are indicated by like numerals having primes.

The holder 11' extends out at one end to terminate in a pivot or hinge 13' to which is connected a threaded rod or stem 46. Then the animation of the specimen and simultaneous progressive movement thereof are brought about by mechanism presently to be described. A lever 47 is pivoted at a fixed point 48 and extends downwardly to a toe 49 engageable with the outer surface of a cam 50 similar to cam 19, Fig. 1. A spring 51 returns the lever to the right after it has been moved in the opposite direction by the cam; it also maintains the toe 49 in engagement with the surface of the cam.

As shown in Figs. 3 and 4, a collar 52, having a projecting stud 53 on which it may pivot in a bearing in lever 47, retains an elongated sleeve 54 threaded internally for the reception of the threaded rod 46. Collar 52 is held in place within the bearing in lever 47 by any suitable retaining means, such as a washer 64 pinned in place on stud 53. As the arm or lever 47 is swung to and fro, collar 52 is moved in a manner similar to pivot 15, Fig. 1. The sleeve 54 is free to rotate within collar 52, but is maintained in axial alignment therewith and receives the same motion as the collar since it terminates at its left-hand end in a flange received within a groove in the collar 52. Sleeve 54 is splined as at 55 for part of its length and on its splines rides a worm wheel 56 retained by a supporting collar 57 which prevents longitudinal or axial movement of the worm wheel. This worm wheel is rotated by a worm (not shown) at the upper end of a shaft 58 rotatable in bearings 59 and 60. At the lower end of that shaft, a bevel gear 61 meshes with a bevel pinion 62 which is in turn fixed on a central shaft 63, similar to the shaft 21, Fig. 1.

Movement of the rod 46, collar 52, and sleeve 54 is confined to not over about one centimeter, and therefore, the angular movement of the lever 47 is extremely slight. While in theory the parts just described have other than a straight line motion, the deviation is so slight as to be practically negligible. Collar 57 is not an especially tight fit radially of the groove within which it engages, and therefore serves only to prevent axial movement of the worm wheel 56. In operation, cam 50 causes oscillation of lever 47, which in turn imparts a corresponding movement to the collar 52 pivoted to the arm. Sleeve 54 moves wtih collar 52, but due to the working fit between the splines 55 and similar grooves in the hub of the worm wheel, it slides within that hub, thereby making it possible to hold the worm wheel relatively stationary so far as axial movement goes, but to rotate it and thereby drive the sleeve 54 so as slowly to progress or advance the threaded rod 46. Rotation of the shaft 63 is such as to impart the required animation of the specimen and the reduction in gearing allows motion to be derived from that same source for slowly rotating the worm wheel and collar 54 so as to progress the specimen across the light beam at a rate to read graininess progressively over an extended area.

The animation of the specimen, as well as its progression according to the modified form of the invention, have been described as linear. It is to be understood that the specimen may be moved in other manners, for example, it may be given a circular movement, either for animation or progression, or both. In that event, the carrier or holder for the specimen is mounted upon a rotating element which is animated to and fro through the requisite distance and also may be simultaneously progressed so as to measure the value of the graininess over an extended area.

If a rotary progressive motion is employed, the cycle may merely be repeated in the same direction of movement. With linear progression, provision is made for return of the holder to its starting position, or alternately, it may be reversed to repeat, not the same, but a similar, reversed cycle. That makes no difference if the reversal is for a new specimen. One construction for quick return includes either a disconnectable worm or bevel pinion so that the screw may be quickly returned by spinning the worm wheel by hand. Reversible movement under power involves a substitution of a reversible threaded screw and correspondingly threaded sleeve.

In place of the simple vacuum phototube used, it is contemplated that an electron multiplier type of phototube may be substituted having a feed back circuit to obtain logarithmic response as described in my co-pending application Serial No. 570,627, filed December 30, 1944, for "Logarithmic Photometers," now Patent No. 2,498,163. By the use of this circuit a less intense light source is permissible and a more sensitive response as well as a greater accuracy realized. Similarly, the amplification may be provided by a series of amplifier stages having log response characteristics.

In this disclosure, mention has been made of film, either positive or negative, or other specimens of which graininess is a characteristic. In the description and claims, the term "film," "specimen," or "light transmissive layer" is intended to include all non-homogeneous transparent or translucent materials of which a quantitative value of graininess may be desired.

The instrument as described is direct reading, that is, an indication of the desired characteristic for the specimen may be read off the meter at any instant after simply inserting the specimen and animating it. In some events, it may be desired to record the value of graininess for a specimen or series of specimens, especially when employing the invention according to the modification. In that case, a recording type miliammeter is provided and the record thus made may be preserved and, of course, is better adapted to a more detailed study than can be made by mere observation of the indicating milliammeter.

While one embodiment and a modification of the invention have been disclosed, it is to be understood that the inventive concept may be carried out in a number of ways. This application is, therefore, not to be limited to the precise details described, but is intended to cover all variations and modifications thereof, falling within the spirit of the invention and the scope of the claim.

I claim:

A device for measuring the graininess of a light transmissive substance, such as photographic film comprising a light source for transilluminating said film, a photosensitive tube having linear response characteristics, means between said source and said tube for directing a beam of light from said source onto said tube, means for animating said film transversely of the light beam whereby excitation of said phototube is varied in accordance with the light transfer characteristics of an explored area of said film resulting in an alternating current component superimposed upon said phototube current, means for compensating said linear response comprising an amplifier having logarithmic transfer characteristics energized from said phototube, an output circuit for said amplifier and means in said circuit for indicating in linearily varying units the magnitude of said superimposed component in terms of graininess, said units being representative of visual impressions in changes of density of said explored area.

MONROE H. SWEET.

References Cited in the file of this patent

UNITED STATES PATENTS

| Number | Name | Date |
|---|---|---|
| 1,640,567 | Firestone | Aug. 30, 1927 |
| 1,991,599 | Davis | Feb. 19, 1935 |
| 2,360,883 | Metcalf | Oct. 24, 1944 |
| 2,406,716 | Sweet | Aug. 27, 1946 |
| 2,413,706 | Gunderson | Jan. 7, 1947 |
| 2,469,935 | Sweet | May 10, 1949 |

OTHER REFERENCES

"A Precision Direct-Reading Densitometer," by Sweet, Jour. Soc. Motion Picture Engineers, February 1942, pages 148–172. (Copy in Division 7.)